United States Patent
Tang

(10) Patent No.: US 12,434,182 B2
(45) Date of Patent: Oct. 7, 2025

(54) FILTERING DEVICE

(71) Applicant: Shenzhen Chenbei Technology Co., Ltd., Shenzhen (CN)

(72) Inventor: Yu Tang, Shenzhen (CN)

( * ) Notice: Subject to any disclaimer, the term of this patent is extended or adjusted under 35 U.S.C. 154(b) by 648 days.

(21) Appl. No.: 17/821,156

(22) Filed: Aug. 19, 2022

(65) Prior Publication Data

US 2023/0054568 A1 Feb. 23, 2023

(30) Foreign Application Priority Data

Aug. 20, 2021 (CN) .......................... 202110962767.2

(51) Int. Cl.
*B01D 46/00* (2022.01)
*B01D 46/52* (2006.01)

(52) U.S. Cl.
CPC ....... *B01D 46/0016* (2013.01); *B01D 46/523* (2013.01)

(58) Field of Classification Search
None
See application file for complete search history.

(56) References Cited

U.S. PATENT DOCUMENTS

| | | | | |
|---|---|---|---|---|
| 3,016,984 A | * | 1/1962 | Getzin | B01D 46/24 55/501 |
| 4,014,796 A | * | 3/1977 | Sugiyama | B01D 29/15 55/498 |
| 8,936,161 B2 | * | 1/2015 | Kimura | B01D 29/112 210/430 |
| 10,307,701 B2 | * | 6/2019 | Klein | B01D 46/4263 |
| 2003/0066425 A1 | * | 4/2003 | Shah | B01D 46/521 55/496 |
| 2012/0174548 A1 | * | 7/2012 | Konzelmann | B01D 29/055 210/232 |
| 2015/0375148 A1 | * | 12/2015 | Klein | B01D 46/521 210/186 |
| 2020/0047097 A1 | * | 2/2020 | Knaus | B01D 45/08 |
| 2021/0370215 A1 | * | 12/2021 | Ehrenberg | B01D 46/2414 |
| 2022/0133107 A1 | * | 5/2022 | Lawrence | F16K 15/145 55/367 |

FOREIGN PATENT DOCUMENTS

WO    WO-9966965 A1 * 12/1999 ........... A61L 27/507

* cited by examiner

*Primary Examiner* — Brit E. Anbacht
(74) *Attorney, Agent, or Firm* — Tsz Lung Yeung

(57) ABSTRACT

A filtering device, including: a filter layer, where the filter layer is enclosed into a cylindrical structure; a support frame includes at least one support ring arranged at the end of the cylindrical structure, the support ring is provided with a plurality of elastic connection portions and a plurality of support ring segments, and two adjacent support ring segments are connected by using one elastic connection portion; the elastic connection portion is capable of being elastically deformed when subjected to an external force and capable of restoring by using its own elastic force; when the elastic connection portion is elastically deformed, an angle at which the end portions of the two adjacent support ring segments are connected changes, which drives a shape of the filter layer to change synchronously; when the elastic connection portion restores, the angle changes, which drives the filter layer to restore to an original shape.

15 Claims, 7 Drawing Sheets

FILTERING DEVICE

CROSS REFERENCE

This is a non-provisional application which claims priority to a Chinese patent application having an application number of CN202110962767.2, and a filing date of Aug. 20, 2021, the entire contents of which is hereby incorporated by reference.

TECHNICAL FIELD

The present invention relates to the technical field of air purification devices, and in particular, to a filtering device.

BACKGROUND

In a process of packaging and transportation, an overall structure of a filtering device (such as a filter screen or a filter element) of an air purifier needs to be packaged, and squeezing against the structure of the filtering device shall be avoided, so as to ensure a use effect of the filtering device.

However, to maximize a filtering area of the filtering device, filtering devices of many air purifiers in the market are each a hollow cylinder. Due to the structural limitation of the hollow cylinder, a packaging size of the filtering device is larger, which leads to a higher transportation cost and wastes social transportation resources.

Therefore, how to reduce a packaging size and a transportation cost is an urgent problem to be resolved by a person skilled in the art.

SUMMARY

In view of the problems, the present invention provides a filtering device to reduce a packaging size and a transportation cost.

To achieve the foregoing objective, the present invention provides the following technical solution:

A filtering device includes:
  a filter layer, where the filter layer is enclosed into a cylindrical structure; and
  a support frame, where the support frame includes at least one support ring arranged at at least one end of the cylindrical structure,
  each of the at least one support ring is provided with a plurality of elastic connection portions and a plurality of support ring segments, and end portions of two adjacent support ring segments are connected to each other by using one elastic connection portion;
  the elastic connection portion is capable of being elastically deformed when subjected to an external force and capable of restoring by using its own elastic force;
  when the elastic connection portion is subjected to the external force and elastically deformed, an angle at which the end portions of the two adjacent support ring segments are connected changes, which drives a shape of the filter layer to change synchronously; and
  when the elastic connection portion restores by using its own elastic force, the angle at which the end portions of the two adjacent support ring segments changes, which drives the filter layer to restore to an original shape, and the original shape is a shape in which the filter layer is when in use.

Optionally, in the foregoing filtering device, the elastic connection portions each include:
  a hinged shaft, configured to hinge connecting ends of two adjacent support ring segments that are close to each other; and
  an elastic member, where one end of the elastic member is connected to one of the two adjacent support ring segments, and the other end of the elastic member is connected to the other support ring segment.

Optionally, in the foregoing filtering device, connecting ends of two adjacent support ring segments connected to the elastic connection portion are provided with abutting portions; the elastic member is a torsion spring, the torsion spring includes a body and elastic arms extending from end portions of the body, the body is sleeved on the hinged shaft, the elastic arm at one end of the body abuts against the abutting portion of one of the two adjacent support ring segments, the elastic arm at the other end of the body abuts against the abutting portion of the other support ring segment, and the body is clamped between two adjacent abutting portions;

or, connecting ends of two adjacent support ring segments connected to the elastic connection portion are provided with connection portion; the elastic member is a tension spring or an elastic rib, one end of the elastic member is connected to the connection portion of one of the two adjacent support ring segments, and the other end of the elastic member is connected to the connection portion of the other support ring segment; and the elastic rib is capable of bending under stress and extending and shortening in an extension direction of the elastic rib.

Optionally, in the foregoing filtering device, the support ring segments each include a first plate-shaped structure and a second plate-shaped structure, and the first plate-shaped structure is connected to the second plate-shaped structure at a certain angle; and
  the first plate-shaped structures of all the support ring segments constitute an annular cylinder, and the second plate-shaped structures of all the support ring segments constitute an annular end plate.

Optionally, in the foregoing filtering device, the first plate-shaped structures are vertically connected to the second plate-shaped structures; and
  an inner layer of the filter layer is attached to the first plate-shaped structures.

Optionally, in the foregoing filtering device, each of the second plate-shaped structures is provided with a plurality of interconnected end plate portions, the plurality of end plate portions are arranged in an extension direction of the second plate-shaped structures, one of an inner side edge and an outer side edge of the second plate-shaped structure is a connecting side edge, and a joint of the end plate portions is located on the connecting side edge; and
  when each of the elastic connection portions is subjected to an external force and elastically deformed, an end portion of each of the support ring segments moves toward the side on which the connecting side edge is located, and an opening portion which opens away from the connecting side edge is formed between two adjacent end plate portions.

Optionally, in the foregoing filtering device, two elastic connection portions are provided, and are symmetrically arranged on the support ring.

Optionally, in the foregoing filtering device, two elastic connection portions are provided, and are symmetrically arranged on the support ring, and the single second plate-shaped structure is provided with two end plate portions; or the single second plate-shaped structure is provided with three end plate portions.

Optionally, in the foregoing filtering device, the support ring is further provided with a plurality of connecting pieces arranged in a circumferential direction of the support ring, each of the connecting pieces extends from a position connected to the support ring to a position away from a center of the support ring, and at least part of the connecting piece extends to a circumferential outer side of the support ring; and the connecting pieces are connected to the filter layer.

Optionally, in the foregoing filtering device, the connecting pieces are inserted into a thickness surface of the filter layer.

Optionally, in the foregoing filtering device, the filter layer has a cylindrical folding structure folded in a corrugated shape; and the connecting pieces are inserted into folding gaps of the filter layer.

Optionally, in the foregoing filtering device, the support frame further includes connecting support strips for connecting two support rings.

Optionally, in the foregoing filtering device, a plurality of connecting support strips are provided; and the connecting support strips are symmetrically arranged on two sides of the elastic connection portions.

Optionally, in the foregoing filtering device, the support rings are each provided with an insertion portion, and the insertion portion is provided with insertion holes; and end portions of the connecting support strips are inserted into the insertion holes.

Optionally, in the foregoing filtering device, the filter layer has a cylindrical folding structure folded in a corrugated shape; and the insertion portions are inserted into the folding gaps of the filter layer.

It can be learned from the foregoing technical solution that, in the filtering device provided in the present invention, the filter layer is enclosed into the cylindrical structure, and the cylindrical structure is supported by the support frame to form a stable cylindrical structure. When the elastic connection portion is subjected to an external force and elastically deformed, an angle at which the end portions of the two adjacent support ring segments are connected changes, which drives a shape of the filter layer to change synchronously, so that the cylindrical structure is also deformed, thereby making the filtering device form a folding structure, to facilitate the placement into a packaging box or a packaging bag. In addition, after the filtering device is taken out from the packaging box or the packaging bag, the filtering device is subjected to no external force, and the elastic connection portion restores by using its own elastic force. The angle at which the end portions of the two adjacent support ring segments changes, which drives the filter layer to restore to an original shape, and the original shape is a shape in which the filter layer is when in use. This enables the support ring to effectively support the cylindrical structure, prevents a user from performing a restoring operation again, and facilitates use. In the filtering device provided in the embodiment of the present invention, a larger packaging size of the filtering device is effectively reduced, thereby reducing a transportation cost and avoiding wasting social transportation resources.

BRIEF DESCRIPTION OF DRAWINGS

To more clearly describe technical solutions in the embodiments of the present invention or in the prior art, accompanying drawings required in the description of the embodiments or the prior art are briefly described below. Obviously, the accompanying drawings in the following description illustrate only some of the embodiments of the present invention, and a person of ordinary skill in the art may further obtain other accompanying drawings from these accompanying drawings without creative efforts.

DESCRIPTION OF EMBODIMENTS

Figure 1:
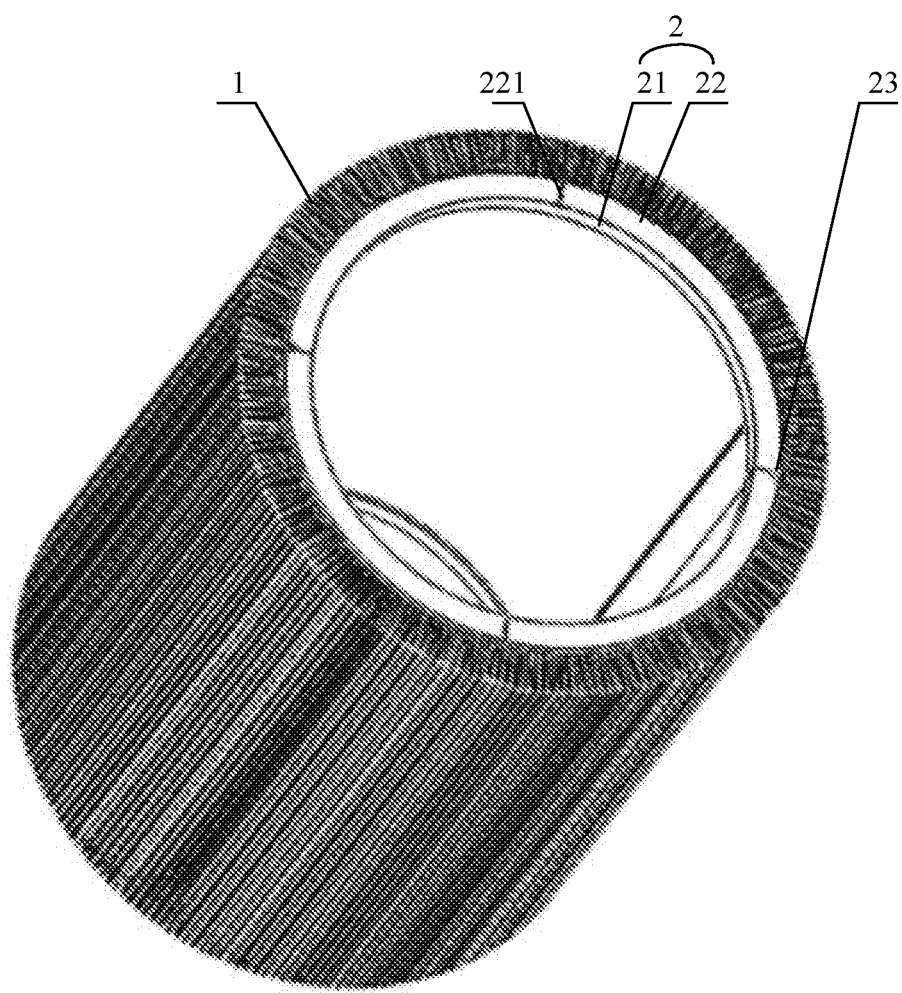
FIG. 1 is a schematic structural diagram of a first filtering device provided in an embodiment of the present invention.

The present invention discloses a filtering device to reduce a packaging size and a transportation cost.

The technical solutions in the embodiments of the present invention are clearly and completely described below with reference to the accompanying drawings in the embodiments of the present invention. Clearly, the described embodiments are only some embodiments of the present invention rather than all embodiments. Based on the embodiments of the present invention, all other embodiments that are obtained by a person of ordinary skill in the art without creative efforts shall all fall within the protection scope of the present invention.

As shown in FIG. 1 to FIG. 9, an embodiment of the present invention provides a filtering device, including: a filter layer 1, where the filter layer 1 is enclosed into a cylindrical structure; a support frame, where the support frame includes at least one support ring 2 arranged at at least one end of the cylindrical structure, each of the at least one support ring 2 is provided with a plurality of elastic connection portions 23 and a plurality of support ring segments, and end portions of two adjacent support ring segments are connected to each other by using one elastic connection portion 23; the elastic connection portion 23 is capable of being elastically deformed when subjected to an external force and capable of restoring by using its own elastic force; when the elastic connection portion 23 is subjected to the external force and elastically deformed, an angle at which the end portions of the two adjacent support ring segments are connected changes, which drives a shape of the filter layer 1 to change synchronously; when the elastic connection portion 23 restores by using its own elastic force, the angle at which the end portions of the two adjacent support ring segments changes, which drives the filter layer 1 to restore to an original shape, and the original shape is a shape in which the filter layer 1 is when in use.

In the filtering device provided in the embodiment of the present invention, the filter layer 1 is enclosed into the cylindrical structure, and the cylindrical structure is supported by the support frame to form a stable cylindrical structure. When the elastic connection portion 23 is subjected to an external force and elastically deformed, an angle at which the end portions of the two adjacent support ring segments are connected changes, which drives a shape of the filter layer 1 to change synchronously, so that the cylindrical structure is also deformed, thereby making the filtering device form a folding structure, to facilitate the placement into a packaging box or a packaging bag. In addition, after the filtering device is taken out from the packaging box or the packaging bag, the filtering device is subjected to no external force, and the elastic connection portion 23 restores by using its own elastic force. The angle at which the end portions of the two adjacent support ring segments changes, which drives the filter layer 1 to restore to an original shape, and the original shape is a shape in which the filter layer 1 is when in use. This enables the support ring 2 to effectively support the cylindrical structure, prevents a user from performing a restoring operation again, and facilitates use. In the filtering device provided in the embodiment of the present invention, a larger packaging size of the filtering device is effectively reduced, thereby reducing a transportation cost and avoiding wasting social transportation resources.

As shown in FIG. 1, FIG. 2, FIG. 3, and FIG. 4, in a first embodiment, the support ring 2 is provided with two elastic connection portions 23 and two support ring segments, and end portions of the two adjacent support ring segments are connected to each other by using one elastic connection portion 23. That is, one end of one support ring segment is connected to one end of the other support ring segment by using one elastic connection portion 23, and the other end of the one support ring segment is connected to the other end of the other support ring segment by using the other elastic connection portion 23.

In this embodiment, each of the support ring segments includes a first plate-shaped structure 21 and a second plate-shaped structure 22, and the first plate-shaped structure 21 is connected to the second plate-shaped structure 22 at a certain angle; the first plate-shaped structures 21 of all the support ring segments constitute an annular cylinder, and the second plate-shaped structures 22 of all the support ring segments constitute an annular end plate.

Each of the second plate-shaped structures 22 is provided with two interconnected end plate portions, that is, the single second plate-shaped structure 22 is provided with two end plate portions. The two end plate portions are arranged in an extension direction of the second plate-shape structure 22, an inner side edge of the second plate-shaped structure 22 is a connecting side edge, and a joint of the two end plate portions is located on the connecting side edge. When each of the elastic connection portions 23 is subjected to an external force and elastically deformed, an end portion of each of the support ring segments moves toward the side on which the connecting side edge is located, and an opening portion 221 which opens away from the connecting side edge (an outer side) is formed between two adjacent end plate portions.

Figure 4:
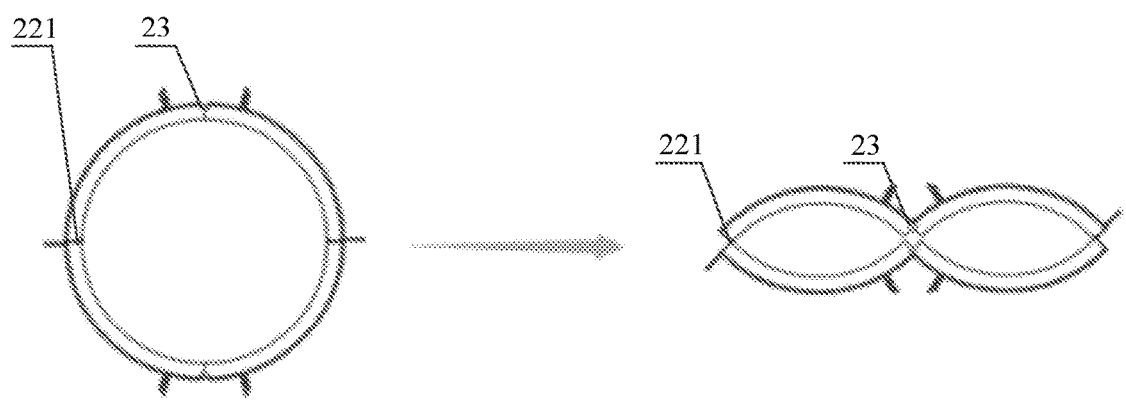
FIG. 4 is a schematic diagram of a bent structure and a restored structure of the first support frame provided in an embodiment of the present invention.

As shown in FIG. 4, when the elastic connection portion 23 is subjected to the external force and elastically deformed, an angle at which the end portions of the two adjacent support ring segments are connected changes, which drives a shape of the filter layer 1 to change synchronously, so that the cylindrical structure is also deformed, thereby making the filtering device form a folding structure, to facilitate the placement into a packaging box or a packaging bag. In this embodiment, the end portions of the two adjacent support ring segments move toward the inside of the support ring 2, and the angle at which the end portions of the two adjacent support ring segments are connected changes, so that the entire support ring 2 has a flattened structure. In this case, the opening portion 221 which opens away from the connecting side edge is formed between the two adjacent end plate portions, that is, the opening portion 221 opens toward the outer side of the support ring 2.

In addition, after the filtering device is taken out from the packaging box or the packaging bag, the filtering device is subjected to no external force, and the elastic connection portion 23 restores by using its own elastic force. The angle at which the end portions of the two adjacent support ring segments changes, which drives the filter layer 1 to restore to an original shape, and the original shape is a shape in which the filter layer 1 is when in use. This enables the support ring 2 to effectively support the cylindrical structure. In this embodiment, the end portions of the two adjacent support ring segments move toward the outside of the support ring 2, and the angle at which the end portions of the two adjacent support ring segments are connected changes, so that the entire support ring 2 has an unfolded (circular) structure. In this case, the opening portion 221 is closed.

Further, the first plate-shaped structures 21 are vertically connected to the second plate-shaped structures 22; and an inner layer of the filter layer 1 is attached to the first plate-shaped structures 21. Certainly, the first plate-shaped structures 21 and the second plate-shaped structures 22 may alternatively be set at other angles. In this embodiment, through the foregoing arrangement, the first plate-shaped structures 21 are attached to an inner wall of the filter layer 1, and the second plate-shaped structures 22 are attached to an end face of the filter layer 1.

Further, two elastic connection portions 23 are provided, and are symmetrically arranged on the support ring 2. That is, the two support ring segments have the same structure.

Figure 8:
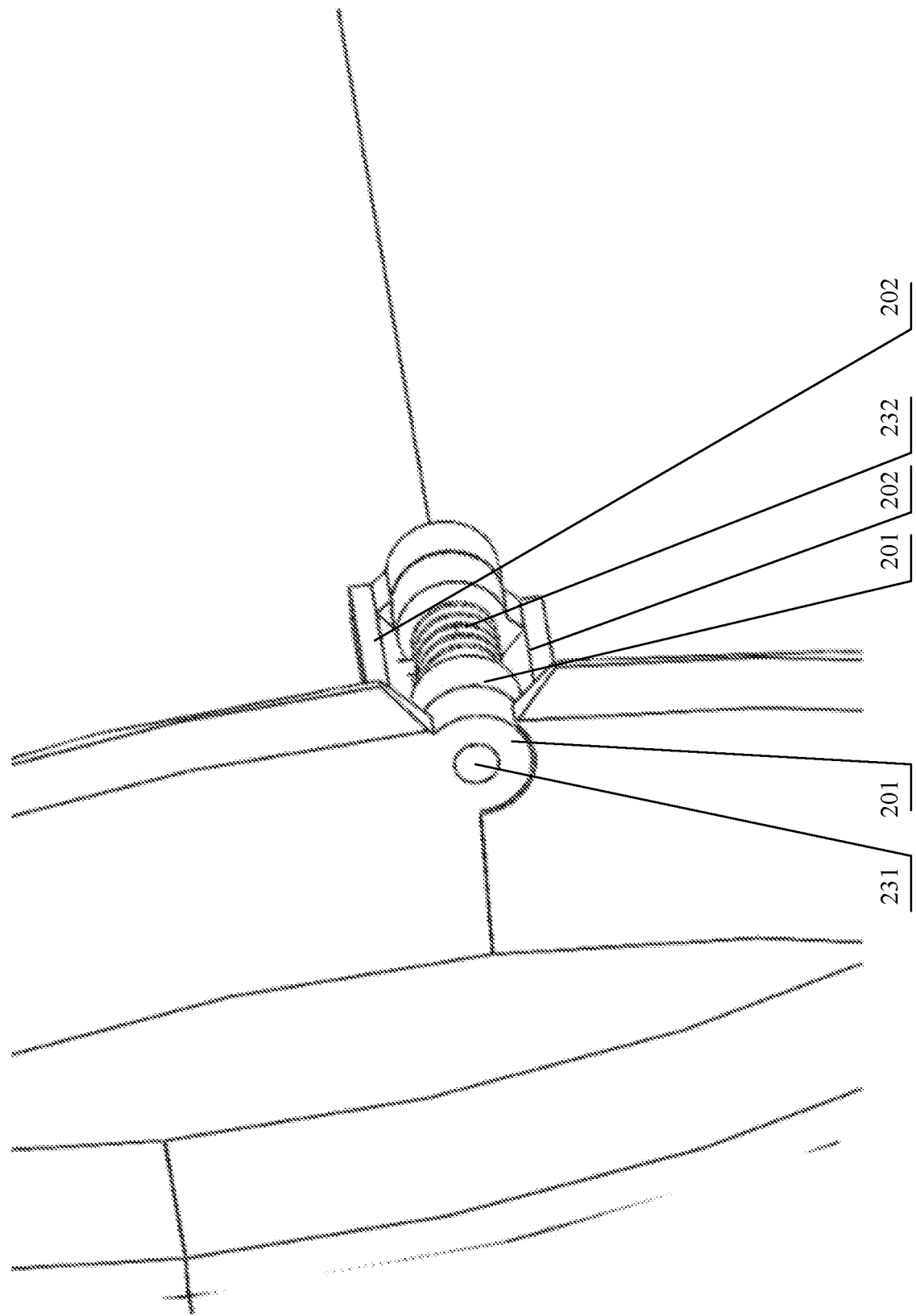
FIG. 8 is a schematic structural diagram of an elastic connection portion provided in an embodiment of the present invention.

As shown in FIG. 8, in this embodiment, each elastic connection portion 23 includes a hinged shaft 231 and an elastic member 232. The hinged shaft 231 is configured to hinge connecting ends of two adjacent support ring segments that are close to each other; one end of the elastic member 232 is connected to one of the two adjacent support ring segments, and the other end of the elastic member 232 is connected to the other support ring segment. Through the foregoing arrangement, the installation of each elastic connection portion 23 is facilitated, and it is also ensured that the elastic connection portion 23 is restored (in an unbent state) by using an elastic restoring force of the elastic member 232.

Certainly, connecting ends of two adjacent support ring segments which are close to each other may alternatively be directly connected by using an elastic louver; or, a connecting member such as a metal elastic sheet, which may be in bent and unbent (unfolded) states, is provided to directly connect connecting ends of two adjacent support ring segments which are close to each other.

To improve connection stability, in a first embodiment of the an elastic connection portion, connecting ends of two adjacent support ring segments connected to the elastic connection portion 23 are provided with abutting portions 202; the elastic member 232 is a torsion spring, the torsion spring includes a body and elastic arms extending from end portions of the body, the body is sleeved on the hinged shaft 231, the elastic arm at one end of the body abuts against the abutting portion 202 of one of the two adjacent support ring segments, the elastic arm at the other end of the body abuts against the abutting portion 202 of the other support ring segment, and the body is clamped between two adjacent abutting portions 202. Through the foregoing arrangement, the elastic connection portion 23 is capable of being elastically deformed when subjected to an external force and capable of restoring by using its own elastic force. Because end portions of two adjacent support ring segments are connected to each other by using one elastic connection portion 23, the elastic arms at two ends of the body of the torsion spring are relatively pressed through mutual approach of the two abutting portions 202, so that the elastic connection portion 23 is elastically deformed when subjected to the external force, and an angle at which the end portions of the two adjacent support ring segments are connected changes, which drives a shape of the filter layer 1 to change synchronously. After the external force is removed, the two abutting portions 202 are away from each other, so that the elastic arms at the two ends of the body of the torsion spring are relatively relaxed. When the elastic connection portion 23 restores by using its own elastic force, the angle at which the end portions of the two adjacent support ring segments changes, which drives the filter layer 1 to restore to an original shape. Certainly, the body of the torsion spring may not be sleeved on the hinged shaft 231, so that the hinged shaft 231 is parallel to the axis of the body of the torsion spring.

When the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. In this case, the elastic member 232 is a torsion spring, and the torsion spring includes a body and elastic arms extending from end portions of the body. Therefore, the abutting portion 202 is located on the outer side of the first plate-shaped structure 21, the elastic arm at one end of the body abuts against the abutting portion 202 of one of the two adjacent support ring segments, and the elastic arm at the other end of the body abuts against the abutting portion 202 of the other support ring segment. Through the foregoing arrangement, the body is exposed on the outer side of the support ring 2. Through the foregoing arrangement, the installation of the torsion spring is facilitated.

Two hinged shafts 231 may alternatively be provided. The two hinged shafts 231 are coaxially arranged to facilitate the hinge of the connecting ends of the two adjacent support ring segments, and the body of the torsion spring is arranged between the two hinged shafts 231.

In a second embodiment of an elastic connection portion, connecting ends of two adjacent support ring segments connected to the elastic connection portion 23 are provided with connection portion; the elastic member 232 is a tension spring, one end of the elastic member 232 is connected to the connection portion of one of the two adjacent support ring segments, and the other end of the elastic member 232 is connected to the connection portion of the other support ring segment. Through the foregoing arrangement, the elastic connection portion 23 is capable of being elastically deformed when subjected to an external force and capable of restoring by using its own elastic force. Because end portions of two adjacent support ring segments are connected to each other by using one elastic connection portion 23, through bending of the tension spring under stress and an operation of elongation in an extension direction of the tension spring, the elastic connection portion 23 is elastically deformed when subjected to the external force, and an angle at which the end portions of the two adjacent support ring segments are connected changes, which drives a shape of the filter layer 1 to change synchronously. Through an operation of retraction of the tension spring in the extension direction of the tension spring, when the elastic connection portion 23 restores by using its own elastic force, the angle at which the end portions of the two adjacent support ring segments changes, which drives the filter layer 1 to restore to an original shape.

When the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. In this case, the elastic member 232 is a tension spring. Therefore, connection portions are located on the outer side of the first plate-shaped structure 21, one end of the elastic member 232 is connected to the connection portion of one of the two adjacent support ring segments, and the other end of the elastic member 232 is connected to the connection portion of the other support ring segment. Through the foregoing arrangement, the tension spring is exposed on the outer side of the support ring 2. Through the foregoing arrangement, the installation of the tension spring is facilitated. The connection between the tension spring and the connection portion may be welding, bonding, or screwing, or hook structures may be formed at two ends of the tension spring, and the connection portion is provided with a structure such as a hanging lug or a hanging hole that matches the hook, to further facilitate the connection between the tension spring and the connection portion.

Similarly, two hinged shafts 231 may alternatively be provided. The two hinged shafts 231 are coaxially arranged to facilitate the hinge of the connecting ends of the two adjacent support ring segments, and a body of the tension spring is arranged between the two hinged shafts 231.

In a third embodiment of an elastic connection portion, connecting ends of two adjacent support ring segments connected to the elastic connection portion 23 are provided with connection portion; the elastic member 232 is an elastic rib, one end of the elastic member 232 is connected to the connection portion of one of the two adjacent support ring segments, and the other end of the elastic member 232 is connected to the connection portion of the other support ring segment. The elastic rib may be bent under stress and elongated and shortened in an extension direction of the elastic rib. Through the foregoing arrangement, the elastic connection portion 23 is capable of being elastically deformed when subjected to an external force and capable of restoring by using its own elastic force. Because end portions of two adjacent support ring segments are connected to each other by using one elastic connection portion 23, through bending of the elastic rib under stress and an operation of elongation in an extension direction of the elastic rib, the elastic connection portion 23 is elastically deformed when subjected to the external force, and an angle at which the end portions of the two adjacent support ring segments are connected changes, which drives a shape of the filter layer 1 to change synchronously. Through an operation of retraction of the elastic rib in the extension direction of the elastic rib, when the elastic connection portion 23 restores by using its own elastic force, the angle at which the end portions of the two adjacent support ring segments changes, which drives the filter layer 1 to restore to an original shape. The elastic rib may be made of rubber or other elastic materials. One end of the elastic rib is connected to the connection portion of one of the two adjacent support ring segments, and the other end of the elastic rib is connected to the connection portion of the other support ring segment. Through the foregoing arrangement, when the elastic connection portion 23 is subjected to an external force, the elastic rib is stressed, and one end of the elastic rib is relatively away from the other end of the elastic rib.

When the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. In this case, the elastic member 232 is an elastic rib. Therefore, connection portions are located on the outer side of the first plate-shaped structure 21, one end of the elastic rib is connected to the connection portion of one of the two adjacent support ring segments, and the other end of the elastic rib is connected to the connection portion of the other support ring segment. Through the foregoing arrangement, the elastic rib is exposed on the outer side of the support ring 2. Through the foregoing arrangement, the installation of the elastic rib is facilitated. The connection between the elastic rib and the connection portion may be welding, bonding, or screwing, or hook structures may be formed at two ends of the elastic rib, and the connection portion is provided with a structure such as a hanging lug or a hanging hole that matches the hook, to further facilitate the connection between the elastic rib and the connection portion.

The same as above, two hinged shafts 231 may alternatively be provided. The two hinged shafts 231 are coaxially arranged to facilitate the hinge of the connecting ends of the two adjacent support ring segments, and the body of the elastic rib is arranged between the two hinged shafts 231.

The elastic rib may be a rubber strip or other ribs with an elastic extension and retraction effect.

Preferably, each connecting end of the support ring segment is provided with a connecting lug 201 and a connection portion 202. The connecting lug 201 is provided with a hinge hole; and hinge holes of the connecting lugs 201 at the connecting ends of two adjacent support ring segments close to each other are aligned with each other and connected by using the hinged shaft 231. The hinged shaft 231 may alternatively have a curved structure, so that different curved segments are connected to the connecting ends of the two adjacent support ring segments which are close to each other, respectively.

Further, two elastic connection portions 23 are provided, and are symmetrically arranged on the support ring 2. That is, the two support ring segments have the same structure.

The support ring 2 is further provided with two connecting pieces 25 arranged in a circumferential direction of the support ring 2. That is, each support ring segment is provided with one connecting piece 25, and preferably, the connecting piece 25 is arranged in the middle of the support ring segment. Each of the connecting pieces 25 extends from a position connected to the support ring to a position away from a center of the support ring, and at least part of the connecting piece extends to a circumferential outer side of the support ring 2; and the connecting piece 25 is connected to the filter layer 1.

Further, the connecting pieces 25 are inserted into a thickness surface of the filter layer 1. Through insertion, the connecting pieces 25 are stably connected to the filter layer 1.

As shown in FIG. 1, the filter layer 1 has a cylindrical folding structure folded in a corrugated shape; and the connecting pieces 25 are inserted into folding gaps of the filter layer 1.

In this embodiment, two support rings 2 are provided, and are arranged at two ends of the filter layer 1 respectively. The two support rings 2 are connected by using connecting support strips 3. That is, two support rings 2 are provided, and are symmetrically arranged at two ends of the cylindrical structure. Elastic connection portions 23 on the two support rings 2 are symmetrically arranged. Certainly, only one support ring 2 may alternatively be provided, and the support ring 2 may be located inside the cylindrical structure or at one end of the cylindrical structure.

Figure 2:
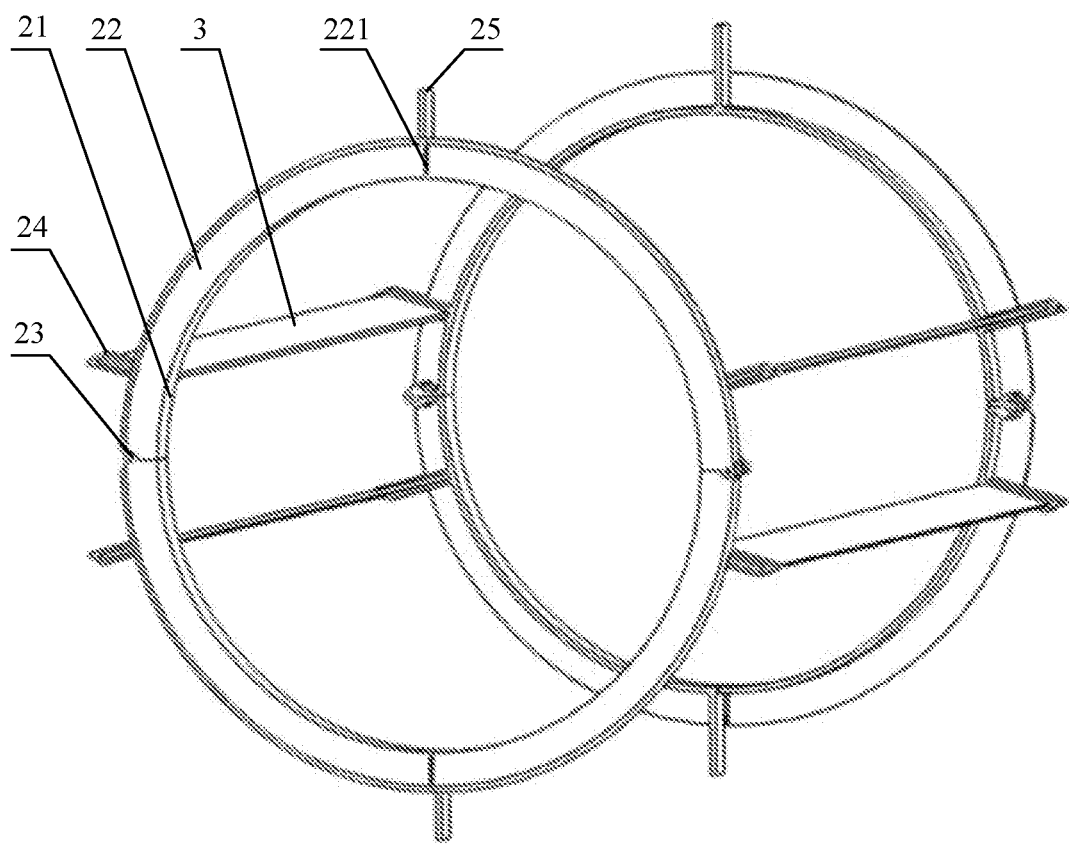
FIG. 2 is a first schematic structural diagram of the first support frame provided in an embodiment of the present invention.
Figure 3:
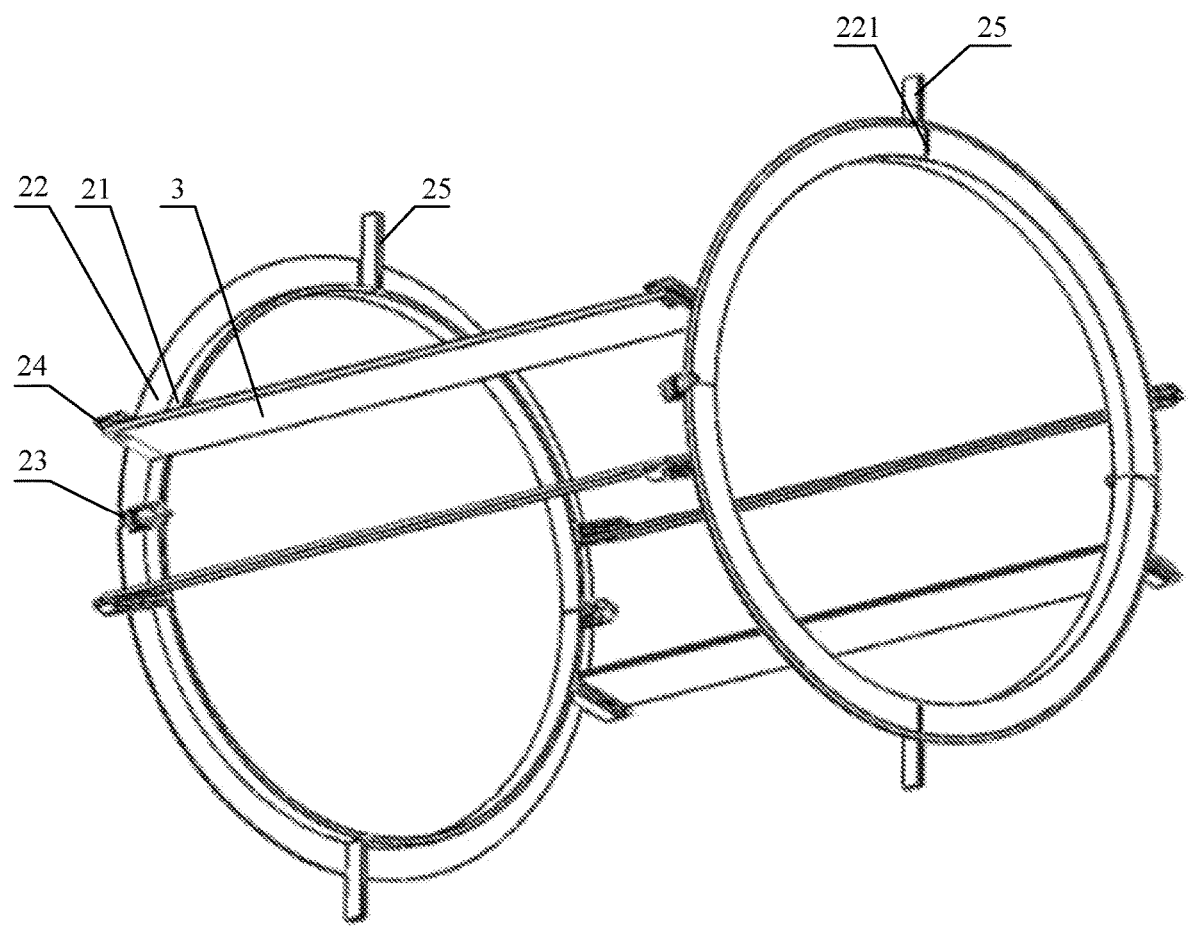
FIG. 3 is a second schematic structural diagram of the first support frame provided in an embodiment of the present invention.

As shown in FIG. 2, four connecting support strips 3 are provided; and connecting support strips 3 are symmetrically arranged on two sides of each elastic connection portion 23. Certainly, a different number of connecting support strips 3 may alternatively be provided or a plurality of connecting support strips 3 are distributed in a circumferential direction of the support ring 2 by using other layout methods. This is not described in detail herein and falls within the protection scope.

For ease of assembly, the support rings 2 are each provided with an insertion portion 24, and the insertion portion 24 is provided with insertion holes; and end portions of the connecting support strips 3 are inserted into the insertion holes.

To improve the stable connection effect between the support ring 2 and the filter layer 1, the insertion portions 24 are inserted into the folding gaps of the filter layer 1. That is, two connecting pieces 25 and four insertion portions 24 are arranged in the circumferential direction of the support ring 2. This improves connection stability between the support ring 2 and the filter layer 1 in the circumferential direction.

In the foregoing embodiment, the connecting pieces 25 may be connected to the filter layer 1 by using a hot melt adhesive after being inserted in and matching the filter layer 1. Similarly, the insertion portions 24 may also be connected to the filter layer 1 by using a hot melt adhesive after being inserted in and matching the filter layer 1. Certainly, other methods, such as screws or staples, may alternatively be used to further connect the connecting pieces 25 to the filter layer 1 and connect the insertion portions 24 to the filter layer 1.

Figure 5:
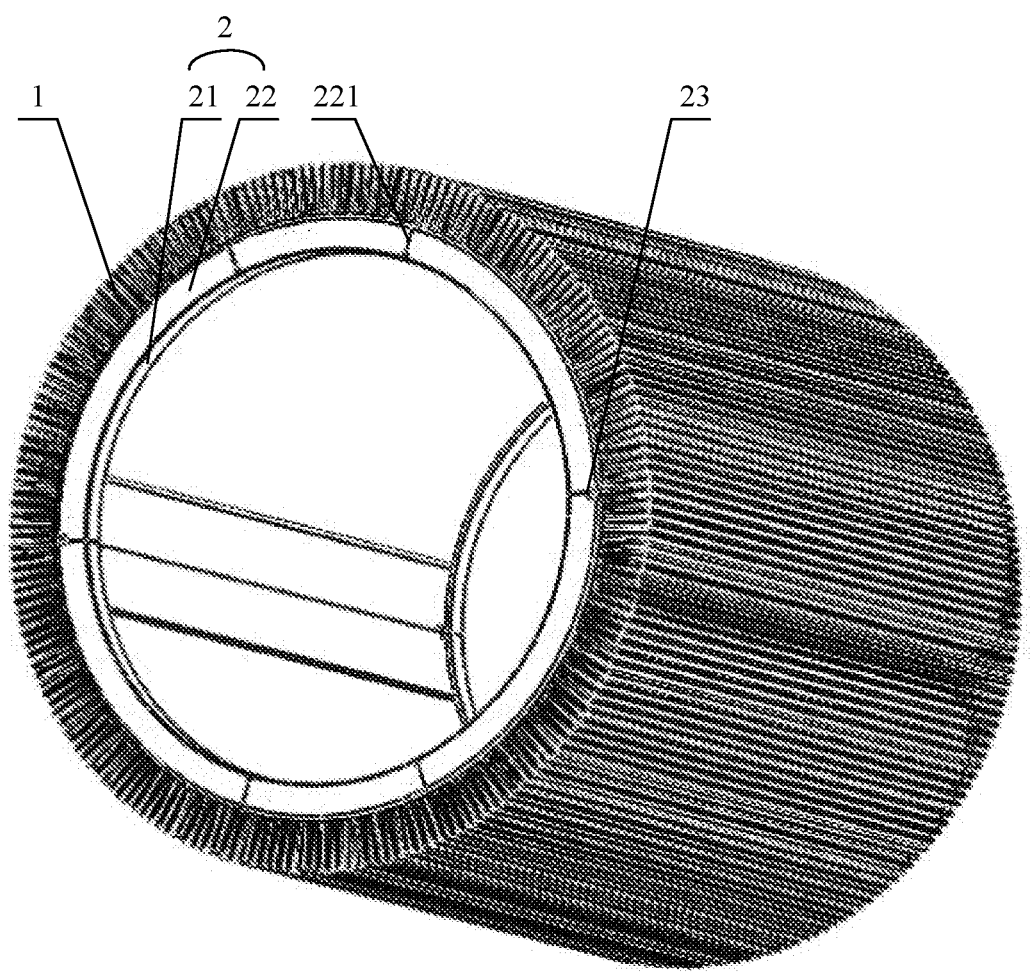
FIG. 5 is a schematic structural diagram of a second filtering device provided in an embodiment of the present invention.
Figure 6:
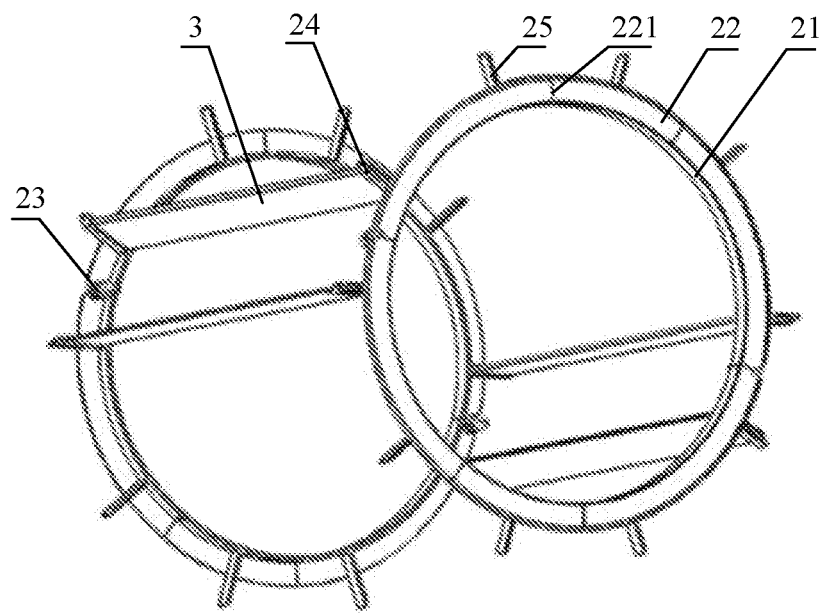
FIG. 6 is a schematic structural diagram of a second support frame provided in an embodiment of the present invention.
Figure 7:
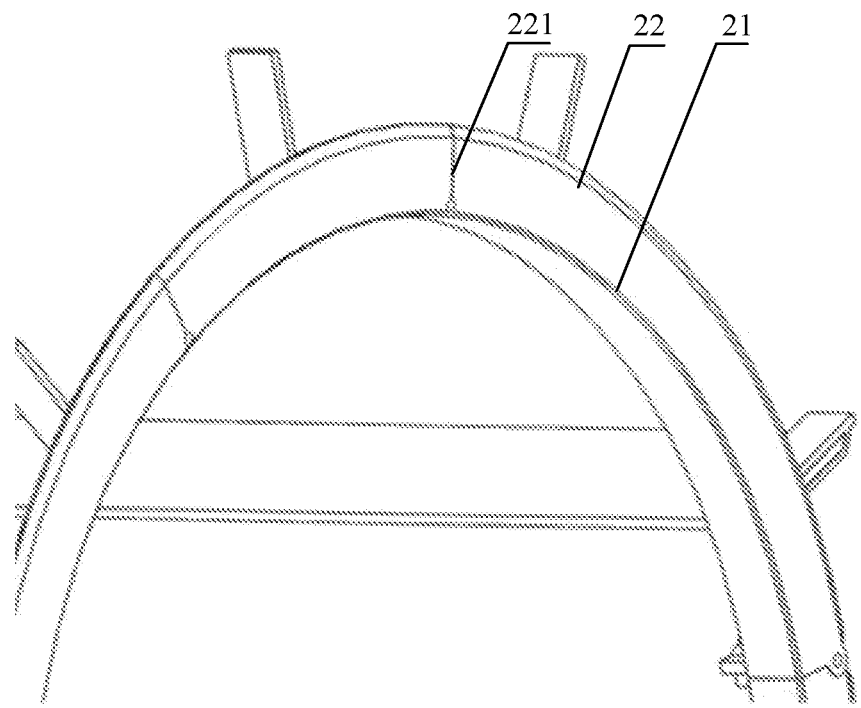
FIG. 7 is a partial schematic structural diagram of the second support frame provided in an embodiment of the present invention.
Figure 9:
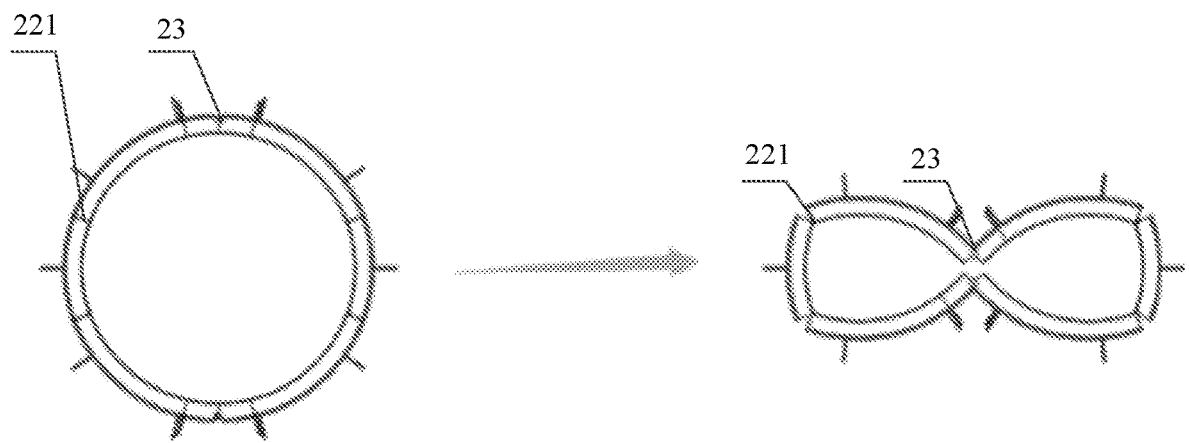
FIG. 9 is a schematic diagram of a bent structure and a restored structure of the second support frame provided in an embodiment of the present invention.

As shown in FIG. 5, FIG. 6, and FIG. 9, in a second embodiment, the support ring 2 is provided with two elastic connection portions 23 and two support ring segments, and end portions of the two adjacent support ring segments are connected to each other by using one elastic connection portion 23. That is, one end of one support ring segment is connected to one end of the other support ring segment by using one elastic connection portion 23, and the other end of the one support ring segment is connected to the other end of the other support ring segment by using the other elastic connection portion 23.

In addition, in this embodiment, each of the support ring segments includes a first plate-shaped structure 21 and a second plate-shaped structure 22, and the first plate-shaped structure 21 is connected to the second plate-shaped structure 22 at a certain angle; the first plate-shaped structures 21 of all the support ring segments constitute an annular cylinder, and the second plate-shaped structures 22 of all the support ring segments constitute an annular end plate.

Each of the second plate-shaped structures 22 is provided with three end plate portions, that is, the single second plate-shaped structure 22 is provided with three end plate portions. The three end plate portions are arranged in an extension direction of the second plate-shape structure 22, an inner side edge of the second plate-shaped structure 22 is a connecting side edge, and a joint of the three end plate portions is located on the connecting side edge. When each of the elastic connection portions 23 is subjected to an external force and elastically deformed, an end portion of each of the support ring segments moves toward the side on which the connecting side edge is located, and an opening portion 221 which opens away from the connecting side edge (an outer side) is formed between two adjacent end plate portions. In this embodiment, the single second plate-shaped structure 22 is provided with two opening portions 221.

As shown in FIG. 9, when the elastic connection portion 23 is subjected to the external force and elastically deformed, an angle at which the end portions of the two adjacent support ring segments are connected changes, which drives a shape of the filter layer 1 to change synchronously, so that the cylindrical structure is also deformed, thereby making the filtering device form a folding structure, to facilitate the placement into a packaging box or a packaging bag. In this embodiment, the end portions of the two adjacent support ring segments move toward the inside of the support ring 2, and the angle at which the end portions of the two adjacent support ring segments are connected changes, so that the entire support ring 2 has a flattened structure. In this case, the opening portion 221 which opens away from the connecting side edge is formed between the two adjacent end plate portions, that is, the opening portion 221 opens toward the outer side of the support ring 2.

In addition, after the filtering device is taken out from the packaging box or the packaging bag, the filtering device is subjected to no external force, and the elastic connection portion 23 restores by using its own elastic force. The angle at which the end portions of the two adjacent support ring segments changes, which drives the filter layer 1 to restore to an original shape, and the original shape is a shape in which the filter layer 1 is when in use. This enables the support ring 2 to effectively support the cylindrical structure. In this embodiment, the end portions of the two adjacent support ring segments move toward the outside of the support ring 2, and the angle at which the end portions of the two adjacent support ring segments are connected changes, so that the entire support ring 2 has an unfolded (circular) structure. In this case, the opening portion 221 is closed.

Further, the first plate-shaped structures 21 are vertically connected to the second plate-shaped structures 22; and an inner layer of the filter layer 1 is attached to the first plate-shaped structures 21. Certainly, the first plate-shaped structures 21 and the second plate-shaped structures 22 may alternatively be set at other angles. In this embodiment, through the foregoing arrangement, the first plate-shaped structures 21 are attached to an inner wall of the filter layer 1, and the second plate-shaped structures 22 are attached to an end face of the filter layer 1.

As shown in FIG. 8, in this embodiment, each elastic connection portion 23 includes a hinged shaft 231 and an elastic member 232. The hinged shaft 231 is configured to hinge connecting ends of two adjacent support ring segments that are close to each other; one end of the elastic member 232 is connected to one of the two adjacent support ring segments, and the other end of the elastic member 232 is connected to the other support ring segment. Through the foregoing arrangement, the installation of each elastic connection portion 23 is facilitated, and it is also ensured that the elastic connection portion 23 is restored (in an unbent state) by using an elastic restoring force of the elastic member 232.

Certainly, connecting ends of two adjacent support ring segments which are close to each other may alternatively be directly connected by using an elastic louver; or, a connecting member such as a metal elastic sheet, which may be in bent and unbent (unfolded) states, is provided to directly connect connecting ends of two adjacent support ring segments which are close to each other.

The elastic connection portion 23 may be the same as the elastic connection portion 23 in the first embodiment.

That is, in the first embodiment of the elastic connection portion, the connecting ends of the two adjacent support ring segments connected to the elastic connection portion 23 are provided with abutting portions 202. The elastic member 232 is a torsion spring, the torsion spring includes a body and an elastic arm extending from an end portion of the body, the body is sleeved on the hinged shaft 231, the elastic arm at one end of the body abuts against the abutting portion 202 of one of the two adjacent support ring segments, the elastic arm at the other end of the body abuts against the abutting portion 202 of the other support ring segment, and the body is clamped between two adjacent abutting portions 202. Similarly, when the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. As the elastic member 232 is a torsion spring, the abutting portion 202 is located on the outer side of the first plate-shaped structure 21, the elastic arm at one end of the body abuts against the abutting portion 202 of one of the two adjacent support ring segments, and the elastic arm at the other end of the body abuts against the abutting portion 202 of the other support ring segment. This makes the body exposed on the outer side of the support ring 2. Through the foregoing arrangement, the installation of the torsion spring is facilitated.

In a second embodiment of an elastic connection portion, connecting ends of two adjacent support ring segments connected to the elastic connection portion 23 are provided with connection portion; the elastic member 232 is a tension spring, one end of the elastic member 232 is connected to the connection portion of one of the two adjacent support ring segments, and the other end of the elastic member 232 is connected to the connection portion of the other support ring segment. When the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. In this case, the elastic member 232 is a tension spring. Therefore, connection portions are located on the outer side of the first plate-shaped structure 21, one end of the elastic member 232 is connected to the connection portion of one of the two adjacent support ring segments, and the other end of the elastic member 232 is connected to the connection portion of the other support ring segment. Through the foregoing arrangement, the tension spring is exposed on the outer side of the support ring 2. Through the foregoing arrangement, the installation of the tension spring is facilitated. The connection between the tension spring and the connection portion may be welding, bonding, or screwing, or hook structures may be formed at two ends of the tension spring, and the connection portion is provided with a structure such as a hanging lug or a hanging hole that matches the hook, to further facilitate the connection between the tension spring and the connection portion.

In a third embodiment of an elastic connection portion, connecting ends of two adjacent support ring segments connected to the elastic connection portion 23 are provided with connection portion; the elastic member 232 is an elastic rib, one end of the elastic member 232 is connected to the connection portion of one of the two adjacent support ring segments, and the other end of the elastic member 232 is connected to the connection portion of the other support ring segment. The elastic rib may be bent under stress and elongated and shortened in an extension direction of the elastic rib. When the elastic connection portion 23 is subjected to the external force and elastically deformed, the end portions of the two adjacent support ring segments move toward the inside of the support ring 2, and the angle at which the end portions of the two adjacent support ring segments are connected changes, so that the entire support ring 2 has a flattened structure. In this case, the elastic member 232 is an elastic rib. Therefore, connection portions are located on the outer side of the first plate-shaped structure 21, one end of the elastic rib is connected to the connection portion of one of the two adjacent support ring segments, and the other end of the elastic rib is connected to the connection portion of the other support ring segment. Through the foregoing arrangement, the elastic rib is exposed on the outer side of the support ring 2. Through the foregoing arrangement, the installation of the elastic rib is facilitated. The connection between the elastic rib and the connection portion may be welding, bonding, or screwing, or hook structures may be formed at two ends of the elastic rib, and the connection portion is provided with a structure such as a hanging lug or a hanging hole that matches the hook, to further facilitate the connection between the elastic rib and the connection portion.

Similarly, each connecting end of the support ring segment is provided with a connecting lug 201 and a connection portion 202. The connecting lug 201 is provided with a hinge hole; and hinge holes of the connecting lugs 201 at the connecting ends of two adjacent support ring segments close to each other are aligned with each other and connected by using the hinged shaft 231. The hinged shaft 231 may alternatively have a curved structure, so that different curved segments are connected to the connecting ends of the two adjacent support ring segments which are close to each other, respectively. Two hinged shafts 231 may alternatively be provided. The two hinged shafts 231 are coaxially arranged to facilitate the hinge of the connecting ends of the two adjacent support ring segments, and the body of the foregoing elastic member 232 (the torsion spring, the tension spring or the elastic rib) is arranged between the two hinged shafts 231. The body of the elastic member 232 may be a position of the elastic member 232 other than two end portions.

Further, two elastic connection portions 23 are provided, and are symmetrically arranged on the support ring 2. That is, the two support ring segments have the same structure.

The support ring 2 is further provided with six connecting pieces 25 arranged in a circumferential direction of the support ring 2. That is, three connecting pieces 25 are provided on each support ring segment. Since three end plate portions are provided in this embodiment, preferably, one connecting piece 25 is provided on each end plate portion. Each of the connecting pieces 25 extends from a position connected to the support ring to a position away from a center of the support ring, and at least part of the connecting piece extends to a circumferential outer side of the support ring 2; and the connecting piece 25 is connected to the filter layer 1.

Further, the connecting pieces 25 are inserted into a thickness surface of the filter layer 1. Through insertion, the connecting pieces 25 are stably connected to the filter layer 1.

As shown in FIG. 5, the filter layer 1 has a cylindrical folding structure folded in a corrugated shape; and the connecting pieces 25 are inserted into folding gaps of the filter layer 1.

In this embodiment, two support rings 2 are provided, and are arranged at two ends of the filter layer 1 respectively. The two support rings 2 are connected by using connecting support strips 3. That is, two support rings 2 are provided, and are symmetrically arranged at two ends of the cylindrical structure. Elastic connection portions 23 on the two support rings 2 are symmetrically arranged. Certainly, only one support ring 2 may alternatively be provided, and the support ring 2 may be located inside the cylindrical structure or at one end of the cylindrical structure.

As shown in FIG. 6, four connecting support strips 3 are provided; and connecting support strips 3 are symmetrically arranged on two sides of each elastic connection portion 23. Certainly, a different number of connecting support strips 3 may alternatively be provided or a plurality of connecting support strips 3 are distributed in a circumferential direction of the support ring 2 by using other layout methods. This is not described in detail herein and falls within the protection scope.

For ease of assembly, the support rings 2 are each provided with an insertion portion 24, and the insertion portion 24 is provided with insertion holes; and end portions of the connecting support strips 3 are inserted into the insertion holes.

To improve the stable connection effect between the support ring 2 and the filter layer 1, the insertion portions 24 are inserted into the folding gaps of the filter layer 1. That is, six connecting pieces 25 and four insertion portions 24 are arranged in the circumferential direction of the support ring 2. This improves connection stability between the support ring 2 and the filter layer 1 in the circumferential direction.

In the foregoing embodiment, the connecting pieces 25 may be connected to the filter layer 1 by using a hot melt adhesive after being inserted in and matching the filter layer 1. Similarly, the insertion portions 24 may also be connected to the filter layer 1 by using a hot melt adhesive after being inserted in and matching the filter layer 1. Certainly, other methods, such as screws or staples, may alternatively be used to further connect the connecting pieces 25 to the filter layer 1 and connect the insertion portions 24 to the filter layer 1.

Certainly, in addition to the foregoing two embodiments, many other embodiments may be further included. For example, the support ring 2 is provided with three elastic connection portions 23 and three support ring segments, and end portions of two adjacent support ring segments are connected to each other by using one elastic connection portion 23. The three support ring segments are arranged in sequence and connected by using the elastic connection portions 23 to form a ring structure.

The support ring 2 may alternatively be provided with four elastic connection portions 23 and four support ring segments, or the like. This is not specifically limited herein and falls within the protection scope.

In addition, in the foregoing embodiment, the first plate-shaped structure 21 is connected to the second plate-shaped structure 22 at a certain angle. Preferably, the first plate-shaped structures 21 are vertically connected to the second plate-shaped structures 22, to make the first plate-shaped structures 21 attached to an inner wall of the filter layer 1 and make the second plate-shaped structures 22 attached to an end face of the filter layer 1, so as to improve the connection effect between the support ring 2 and the filter layer 1.

Furthermore, to further improve the connection effect between the support ring 2 and the filter layer 1, the first plate-shaped structures 21 may be connected by using a hot melt adhesive after being attached to the inner wall of the filter layer 1. That is, a hot melt adhesive is provided between the first plate-shaped structures 21 and the inner wall of the filter layer 1. Similarly, the second plate-shaped structures 22 may also be connected by using a hot melt adhesive after being attached to the end face of the filter layer 1. That is, a hot melt adhesive is provided between the second plate-shaped structures 22 and the end face of the filter layer 1. Certainly, other methods, such as screws or staples, may alternatively be used to further connect the first plate-shaped structures 21 to the inner wall of the filter layer 1 and connect the second plate-shaped structures 22 to the end face of the filter layer 1.

An outer side edge of each second plate-shaped structure 22 may alternatively be used as a connecting side edge. When the elastic connection portion 23 is subjected to an external force and elastically deformed, an end portion of each of the support ring segments moves toward the side on which the connecting side edge is located, that is, when the elastic connection portion 23 is subjected to the external force and elastically deformed, an angle at which the end portions of the two adjacent support ring segments are connected changes, which drives a shape of the filter layer 1 to change synchronously, so that the cylindrical structure is also deformed, thereby making the filtering device form a folding structure, to facilitate the placement into a packaging box or a packaging bag. In this embodiment, the end portions of the two adjacent support ring segments move toward the outside of the support ring 2, and an opening portion 221 which opens away from the connecting side edge (an inner side) is formed between the two adjacent end plate portions. In this case, the single second plate-shaped structure 22 is provided with two opening portions 221. The angle at which the end portions of the two adjacent support ring segments are connected changes, so that the entire support ring 2 has a flattened structure. In this case, the opening portion 221 which opens away from the connecting side edge is formed between the two adjacent end plate portions, that is, the opening portion 221 opens toward the inner side of the support ring 2.

In addition, after the filtering device is taken out from the packaging box or the packaging bag, the filtering device is subjected to no external force, and the elastic connection portion 23 restores by using its own elastic force. The angle at which the end portions of the two adjacent support ring segments changes, which drives the filter layer 1 to restore to an original shape, and the original shape is a shape in which the filter layer 1 is when in use. This enables the support ring 2 to effectively support the cylindrical structure. In this case, the end portions of the two adjacent support ring segments move toward the inside of the support ring 2, and the angle at which the end portions of the two adjacent support ring segments are connected changes, so that the entire support ring 2 has an unfolded (circular) structure. In this case, the opening portion 221 is closed.

In the foregoing embodiment, when the elastic connection portion 23 is subjected to the external force and elastically deformed, the end portions of the two adjacent support ring segments move toward the outside of the support ring 2, and the angle at which the end portions of the two adjacent support ring segments are connected changes, so that the entire support ring 2 has a flattened structure.

In the embodiment in which the elastic member 232 is a torsion spring, the torsion spring includes a body and elastic arms extending from end portions of the body. Therefore, the abutting portion 202 is located on the inner side of the first plate-shaped structure 21, the elastic arm at one end of the body abuts against the abutting portion 202 of one of the two adjacent support ring segments, and the elastic arm at the other end of the body abuts against the abutting portion 202 of the other support ring segment. Through the foregoing arrangement, the body of the torsion spring is exposed on the inner side of the support ring 2. An end of the abutting portion 202 facing the inner side of the support ring 2 should be a suspended end, that is, the end is not in contact with other parts (such as the filter layer 1 or the support ring 2) of the filtering device.

In the embodiment in which the elastic member 232 is a tension spring, connection portions are located on the outer side of the first plate-shaped structure 21, one end of the tension spring is connected to the connection portion of one of the two adjacent support ring segments, and the other end of the tension spring is connected to the connection portion of the other support ring segment. Through the foregoing arrangement, the tension spring is exposed on the inner side of the support ring 2.

In the embodiment in which the elastic member 232 is an elastic rib, connection portions are located on the outer side of the first plate-shaped structure 21, one end of the elastic rib is connected to the connection portion of one of the two adjacent support ring segments, and the other end of the elastic rib is connected to the connection portion of the other support ring segment. Through the foregoing arrangement, the elastic rib is exposed on the inner side of the support ring 2.

To facilitate processing, both the abutting portion 202 and the connection portion in the foregoing embodiment are connected to the second plate-shaped structure 22.

In this description, embodiments are described in a progressive manner, and the description of each embodiment focuses on differences from other embodiments. Mutual reference may be made to the same and similar parts of the embodiments.

The foregoing description of the disclosed embodiments enables a person skilled in the art to achieve or use the present invention. Multiple modifications to these embodiments are obvious to a person skilled in the art, and general principles defined herein may be implemented in other embodiments without departing from the spirit or scope of the present invention. Therefore, the present invention is not limited to the embodiments shown herein, but should accord with the widest scope consistent with the principles and novel features disclosed herein.

What is claimed is:

1. A filtering device, comprising:
    a filter layer (1), wherein the filter layer (1) is enclosed into a cylindrical structure; and
    a support frame, wherein the support frame comprises at least one support ring (2) arranged at at least one end of the cylindrical structure,
    each of the at least one support ring (2) is provided with a plurality of elastic connection portions (23) and a plurality of support ring segments, and end portions of two adjacent support ring segments are connected to each other by using one elastic connection portion (23);
    the elastic connection portion (23) is capable of being elastically deformed when subjected to an external force and capable of restoring by using its own elastic force;
    when the elastic connection portion (23) is subjected to the external force and elastically deformed, an angle at which the end portions of the two adjacent support ring segments are connected changes, which drives a shape of the filter layer (1) to change synchronously; and
    when the elastic connection portion (23) restores by using its own elastic force, the angle at which the end portions of the two adjacent support ring segments changes, which drives the filter layer (1) to restore to an original shape, and the original shape is a shape in which the filter layer (1) is when in use.

2. The filtering device according to claim 1, wherein the elastic connection portions (23) each comprise:
    a hinged shaft (231), configured to hinge connecting ends of two adjacent support ring segments that are close to each other; and
    an elastic member (232), wherein one end of the elastic member (232) is connected to one of the two adjacent support ring segments, and the other end of the elastic member (232) is connected to the other support ring segment.

3. The filtering device according to claim 2, wherein connecting ends of two adjacent support ring segments connected to the elastic connection portion (23) are provided with abutting portions (202); the elastic member (232) is a torsion spring, the torsion spring comprises a body and elastic arms extending from end portions of the body, the body is sleeved on the hinged shaft (231), the elastic arm at one end of the body abuts against the abutting portion (202) of one of the two adjacent support ring segments, the elastic arm at the other end of the body abuts against the abutting portion (202) of the other support ring segment, and the body is clamped between two adjacent abutting portions (202);
    or, connecting ends of two adjacent support ring segments connected to the elastic connection portion (23) are provided with connection portion; the elastic member (232) is a tension spring or an elastic rib, one end of the elastic member (232) is connected to the connection portion of one of the two adjacent support ring segments, and the other end of the elastic member (232) is connected to the connection portion of the other support ring segment; and the elastic rib is capable of bending under stress and extending and shortening in an extension direction of the elastic rib.

4. The filtering device according to claim 1, wherein the support ring segments each comprise a first plate-shaped structure (21) and a second plate-shaped structure (22), and the first plate-shaped structure (21) is connected to the second plate-shaped structure (22) at a certain angle; and the first plate-shaped structures (21) of all the support ring segments constitute an annular cylinder, and the second plate-shaped structures (22) of all the support ring segments constitute an annular end plate.

5. The filtering device according to claim 4, wherein the first plate-shaped structures (21) are vertically connected to the second plate-shaped structures (22); and
    an inner layer of the filter layer (1) is attached to the first plate-shaped structures (21).

6. The filtering device according to claim 4, wherein
    each of the second plate-shaped structures (22) is provided with a plurality of interconnected end plate portions, the plurality of end plate portions are arranged in an extension direction of the second plate-shaped structures (22), one of an inner side edge and an outer side edge of the second plate-shaped structure (22) is a connecting side edge, and a joint of the end plate portions is located on the connecting side edge; and
    when each of the elastic connection portions (23) is subjected to an external force and elastically deformed, an end portion of each of the support ring segments moves toward the side on which the connecting side edge is located, and an opening portion (221) which opens away from the connecting side edge is formed between two adjacent end plate portions.

7. The filtering device according to claim 1, wherein two elastic connection portions (23) are provided, and are symmetrically arranged on the support ring (2).

8. The filtering device according to claim 4, wherein two elastic connection portions (23) are provided, and are symmetrically arranged on the support ring (2), and the single second plate-shaped structure (22) is provided with two end plate portions; or
    the single second plate-shaped structure (22) is provided with three end plate portions.

9. The filtering device according to claim 1, wherein the support ring (2) is further provided with a plurality of connecting pieces (25) arranged in a circumferential direction of the support ring (2), each of the connecting pieces (25) extends from a position connected to the support ring to a position away from a center of the support ring, and at least part of the connecting piece extends to a circumferential outer side of the support ring (2); and
    the connecting pieces (25) are connected to the filter layer (1).

10. The filtering device according to claim 9, wherein the connecting pieces (25) are inserted into a thickness surface of the filter layer (1).

11. The filtering device according to claim 10, wherein the filter layer (1) has a cylindrical folding structure folded in a corrugated shape; and
    the connecting pieces (25) are inserted into folding gaps of the filter layer (1).

12. The filtering device according to claim 1, wherein the support frame further comprises connecting support strips (3) for connecting two support rings (2).

13. The filtering device according to claim 12, wherein a plurality of connecting support strips (3) are provided; and
    the connecting support strips (3) are symmetrically arranged on two sides of the elastic connection portions (23).

14. The filtering device according to claim 12, wherein the support rings (2) are each provided with an insertion portion (24), and the insertion portion (24) is provided with insertion holes; and
    end portions of the connecting support strips (3) are inserted into the insertion holes.

15. The filtering device according to claim 14, wherein the filter layer (1) has a cylindrical folding structure folded in a corrugated shape; and the insertion portions (24) are inserted into the folding gaps of the filter layer (1).

\* \* \* \* \*